United States Patent Office 3,308,145
Patented Mar. 7, 1967

3,308,145
SILOXANES
Charles W. Lentz, Midland, Mich., assignor to Dow Corning Corporation, Midland, Mich., a corporation of Michigan
No Drawing. Filed Aug. 28, 1963, Ser. No. 305,209
14 Claims. (Cl. 260—448.2)

This invention relates to new siloxanes useful, for example, as "fluid springs," hydraulic fluids and lubricants.

More specifically, this invention relates to siloxanes having the general formula (1)
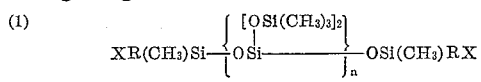

wherein X is a member selected from the group consisting of the hydrogen atom, chlorine atom, hydroxyl group and alkoxy groups containing from 1 to 4 carbon atoms, R is a member selected from the group consisting of the phenyl and methyl groups, and $n$ is an integer equal to at least 1.

This invention also relates to siloxanes having the general formula (2)
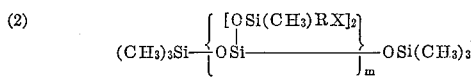

wherein X and R have the above defined meanings, and $m$ is an integer equal to at least 2.

This invention further relates to processes of preparing siloxanes having the general Formulae 1 and 2.

The solixanes (1) containing a hydrogen atom attached to a silicon atom can be prepared, for example, by cohydrolyzing [(CH$_3$)$_3$SiO]$_2$Si(OCH$_3$)$_2$ and a compound selected from the group consisting of H(CH$_3$)$_2$SiOCH$_3$ and (C$_6$H$_5$)(CH$_3$)HSiOCH$_3$ and then co-condensing the hydrolyzates. The corresponding siloxanes wherein the hydrogen attached to the silicon is replaced by a chlorine atom can be prepared, for example, by the chlorination of the corresponding hydrogen containing siloxane. The corresponding hydroxy and alkoxy-substituted siloxanes can be prepared, for example, by hydrolysis and alcoholysis, respectively, of the corresponding chlorine containing siloxane.

A preferred and alternative method for preparing the siloxane (1) when X is a hydrogen atom, R is a phenyl group and $n$ is 1, consists of reacting [(CH$_3$)$_3$SiO]$_4$Si and (C$_6$H$_5$)(CH$_3$)HSiCl in the presence of a catalyst such as FeCl$_3$. Also, preferred and alternative method for preparing the siloxane (1) when X is a hydrogen atom, R is a methyl group and $n$ is 1, consists of reacting [(CH$_3$)$_3$SiO]$_4$Si and [(CH$_3$)$_2$HSi]$_2$O in the presence of a catalyst.

The siloxanes (2) containing a hydrogen atom attached to a silicon atom can be prepared, for example, by cohydrolyzing (CH$_3$)$_3$SiOCH$_3$ and a compound selected from the group consisting of [H(CH$_3$)$_2$SiO]$_2$Si(OCH$_3$)$_2$ and [(C$_6$H$_5$)(CH$_3$)HSiO]$_2$Si(OCH$_3$)$_2$ and then cocondensing the hydrolyzates. The corresponding siloxanes wherein the hydrogen attached to the silicon is replaced by a chlorine atom can be prepared, for example, by the chlorination of the corresponding hydrogen containing siloxane. The corresponding hydroxy and alkoxy substituted siloxanes can be prepared, for example, by hydrolysis and alcoholysis, respectively, of the corresponding chlorine containing siloxane.

Illustrative of the alkoxy groups that can be present in the above formula are the methoxy, ethoxy, propoxy, isopropoxy, butoxy, isobutoxy, secondary butoxy and tertiary butoxy groups.

In order that those skilled in the art can better understand how the present invention can be practiced, the following examples are given by way of illustration and not by way of limitation.

In the examples, the purity of the compounds was confirmed employing an F and M Vapor Phase Chromatography Model 500 apparatus and the structure of the compounds confirmed by infrared spectroscopy.

Example 1

To a three liter flask equipped with a stirrer, 900 ml. of toluene, 900 ml. (2 mols) of [(CH$_3$)$_3$SiO]$_4$Si, 600 ml. (4 mols) of (C$_6$H$_5$)(CH$_3$)HSiCl and 9 g. of FeCl$_3$ were added. This mixture was stirred for about 17 hours at room temperature. The mixture was then filtered and the filtrate then added to ice in a separatory funnel equipped with a stirrer. The filtrate was then washed several times with water until it was neutral. The mixture was then dried over sodium sulfate and after drying again filtered. The mixture was then stripped to a pot temperature of 157° C. at .2 mm. of pressure. The remaining liquid was then fractionated with 135.3 g. (about 89 cc.) of a liquid being collected at a temperature of 110 to 121° C. at about .25 mm. of pressure. This liquid was determined to be

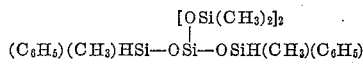

Example 2

To a three liter flask equipped with a stirrer, 890 ml. (2 mols) of [(CH$_3$)$_3$SiO]$_4$Si, 536 g. (4 mols) of

[(CH$_3$)$_2$HSi]$_2$O and 120 g. (50% toluene) of drained Amberlyst-15 ion exhcange resin were added. (Amberlyst-15 is a cationic ion exchange resin containing sulfonic acid functional groups. It is in the form of beads about 1 to 3 mm. in diameter.) This mixture was stirred for about 23 hours at room temperature and then the liquid was decanted from the resin. Then 890 ml. of [(CH$_3$)$_3$SiO]$_4$Si and 536 g. of [(CH$_3$)$_2$HSi]$_2$O were added to the resin catalyst and the mixture stirred for about 5 hours at room temperature. The liquid was then decanted from the resin and combined with the first decant above. The combined liquids were then stripped to remove low boiling materials, washed two times with water, dried and then filtered. Fractionation of the liquid yielded 205 g. (about 200 cc.) of a pure liquid having a boiling point of 203° C. This liquid was determined to be

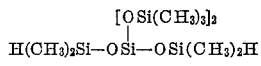

Example 3

To a 500 ml. 3-neck flask fitted with a thermometer, scrubber, gas dispersion tube and magnetic stirrer, 75 g. of

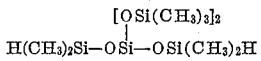

and 100 ml. of carbon tetrachloride were added. The flask was wrapped with aluminum foil and cooled with an ice bath. Chlorine was added to the flask at the rate of 100 cc. per minute for about two hours and 15 minutes. During this time the temperature rose from 3° C. to 17° C. The chlorine was turned off and then the mixture swept with air. Fractionation of the liquid yielded 29 g. (about 31 cc.) of a pure liquid having a boiling point of 138 to 140° C. at 35 mm. of pressure. This liquid was determined to be

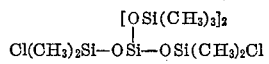

Example 4

When the

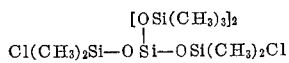

of Example 3 is hydrolyzed, a siloxane having the formula

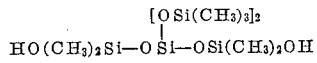

is obtained.

Example 5

When the

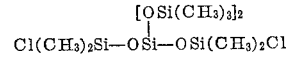

of Example 3 is treated with $CH_3OH$, $(CH_3)_2CHOH$ or $C_4H_9OH$, employing conventional alcoholysis techniques, siloxanes having the respective formulae

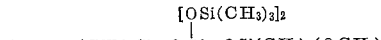

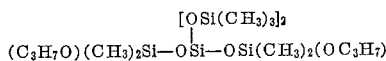

and

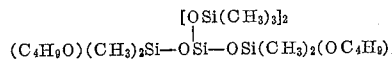

are obtained.

Example 6

When the

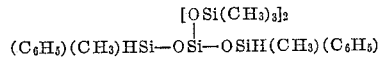

of Example 1 is chlorinated employing the process of Example 3, a siloxane having the formula

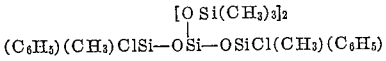

is obtained.

When the chlorine containing siloxane obtained above is hydrolyzed, a siloxane of the formula

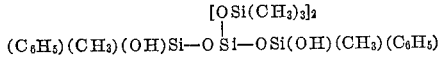

is obtained.

When the chlorine containing siloxane obtained above is treated with $CH_3OH$ or $C_2H_5OH$, employing conventional alcoholysis techniques, siloxanes are obtained having the respective formulae

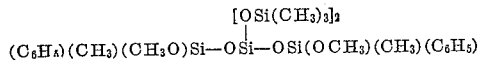

and

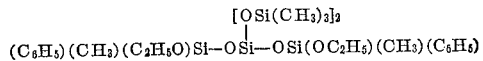

Example 7

When $[(CH_3)_3SiO]_2Si(OCH_3)_2$ and $H(CH_3)_2SiOCH_3$ are cohydrolyzed and the hydrolyzates cocondensed, siloxanes having the formula

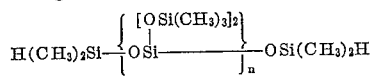

wherein $n$ is equal to or greater than 1 are obtained. Thus, siloxanes wherein $n$ is 1, 2, 5, 10, 25, 50, 72 and 100 are obtained.

When the above obtained siloxanes are chlorinated, corresponding siloxanes having the formula

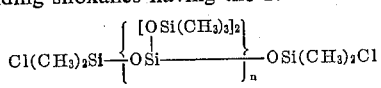

are obtained.

When the above chlorine containing siloxanes are subjected to hydrolysis or alcoholysis (with alcohols containing from 1 to 4 carbon atoms), corresponding siloxanes having the respective formulae

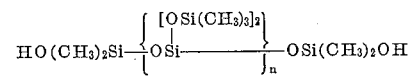

and

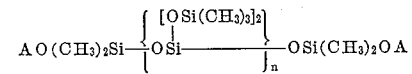

wherein A is an alkyl group containing from 1 to 4 carbon atoms, are obtained.

Example 8

When $(C_6H_5)(CH_3)HSiOCH_3$ is substituted for $H(CH_3)_2SiOCH_3$ as a starting material in Example 7, a similar series of siloxanes containing $(C_6H_5)(CH_3)HSi-$, $(C_6H_5)(CH_3)ClSi-$, $(C_6H_5)(CH_3)(OH)Si-$ and $(C_6H_5)(CH_3)(AO)Si-$ groups is obtained.

Example 9

When $(CH_3)_3SiOCH_3$ and $[H(CH_3)_2SiO]_2Si(OCH_3)_2$ are cohydrolyzed and the hydrolyzates cocondensed, siloxanes of the formula

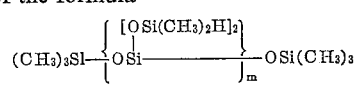

wherein $m$ is equal to or greater than 2 are obtained. Thus, siloxanes wherein $m$ is 2, 4, 5, 10, 25, 52, 70 and 100 are obtained.

When the above obtained siloxanes are chlorinated corresponding siloxanes having the formula

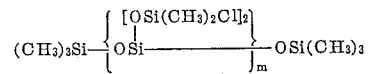

are obtained.

When the above chlorine containing siloxanes are subjected to hydrolysis or alcoholysis (with alcohols containing from 1 to 4 carbon atoms), corresponding siloxanes having the respective formulae

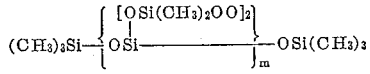

and

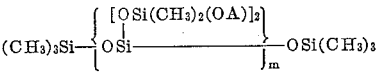

wherein A is an alkyl group containing from 1 to 4 carbon atoms, are obtained.

Example 10

When $[(C_6H_5)(CH_3)HSiO]_2Si(OCH_3)_2$ is substituted for $[H(CH_3)_2SiO]_2Si(OCH_3)_2$ as a starting in Example 9, a similar series of siloxanes containing $(C_6H_5)(CH_3)HSi-$, $(C_6H_5)(CH_3)ClSi-$, $(C_6H_5)(CH_3)(OH)Si-$ and $(C_6H_5)(CH_3)(AO)Si-$ groups is obtained.

That which is claimed is:
1. A siloxane having the general formula

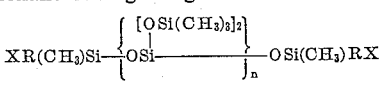

wherein
   X is a member selected from the group consisting of the hydrogen atom, chlorine atom, hydroxyl group and alkoxy groups containing from 1 to 4 carbon atoms,
   R is a member selected from the group consisting of the phenyl and methyl groups, and
   $n$ is an integer equal to at least 1.

2. The siloxane
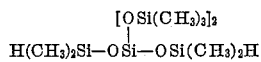
3. The siloxane
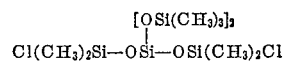
4. The siloxane
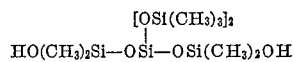
5. The siloxane
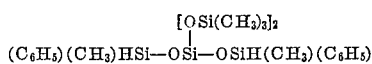
6. The siloxane
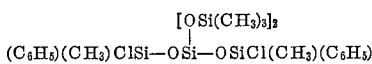
7. The siloxane
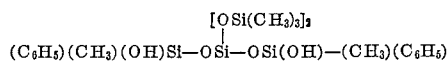
8. A siloxane having the general formula
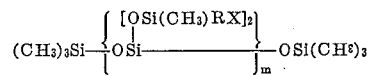
wherein
X is a member selected from the group consisting of the hydrogen atom, chlorine atom, hydroxyl group and alkoxy groups containing from 1 to 4 carbon atoms,
R is a member selected from the group consisting of the phenyl and methyl groups, and
$m$ is an integer equal to at least 2.

9. The siloxane
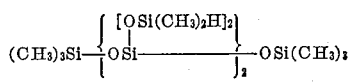
10. The siloxane
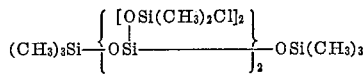
11. The siloxane
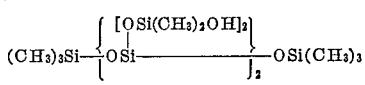
12. The siloxane
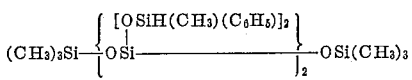
13. The siloxane
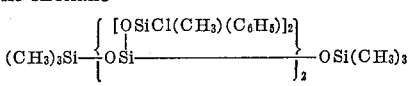
14. The siloxane
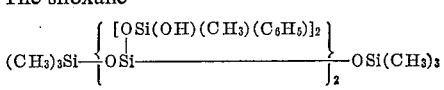

No references cited.

TOBIAS E. LEVOW, *Primary Examiner.*
P. F. SHAVER, *Assistant Examiner.*